US012768793B2

(12) United States Patent
Ando et al.

(10) Patent No.: US 12,768,793 B2
(45) Date of Patent: Oct. 20, 2026

(54) ANALYZER AND ANALYSIS METHOD

(71) Applicant: Hitachi, Ltd., Tokyo (JP)

(72) Inventors: Takahiro Ando, Tokyo (JP); Sakuichiro Adachi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 17/295,640

(22) PCT Filed: Oct. 31, 2019

(86) PCT No.: PCT/JP2019/042733
§ 371 (c)(1),
(2) Date: May 20, 2021

(87) PCT Pub. No.: WO2020/116058
PCT Pub. Date: Jun. 11, 2020

(65) Prior Publication Data

US 2022/0003685 A1 Jan. 6, 2022

(30) Foreign Application Priority Data

Dec. 5, 2018 (JP) ................................. 2018-228229

(51) Int. Cl.
*G01N 21/78* (2006.01)
*G01N 21/03* (2006.01)
(Continued)

(52) U.S. Cl.
CPC ......... *G01N 21/78* (2013.01); *G01N 21/0303* (2013.01); *G01N 21/17* (2013.01);
(Continued)

(58) Field of Classification Search
None
See application file for complete search history.

(56) References Cited

U.S. PATENT DOCUMENTS 8,619,253 B2 * 12/2013 Yu .......................... G01N 21/03
356/246
9,857,308 B2 * 1/2018 Tajima .................. G01N 21/76
(Continued)

FOREIGN PATENT DOCUMENTS

JP S5611345 A 2/1981
JP S56154665 A 11/1981
(Continued)

OTHER PUBLICATIONS

Search Report mailed Jan. 28, 2020 in International Application No. PCT/JP2019/042733.
(Continued)

*Primary Examiner* — Lore R Jarrett
(74) *Attorney, Agent, or Firm* — Miles & Stockbridge, P.C.

(57) ABSTRACT

Provided are an analyzer that analyzes a specimen with high accuracy and an analysis method for analyzing a specimen with high accuracy. The analyzer according to the present disclosure include a first reaction vessel which contains a reagent, a second reaction vessel which contains a specimen and the reagent, a detector which detects optical characteristics of the first reaction vessel and optical characteristics of the second reaction vessel, and a controller which analyzes components of the specimen in the second reaction vessel using the optical characteristics of the first reaction vessel as a baseline.

13 Claims, 7 Drawing Sheets

(51) Int. Cl.
*G01N 21/17* (2006.01)
*G01N 21/75* (2006.01)

(52) U.S. Cl.
CPC ................ *G01N 2021/0357* (2013.01); *G01N 2021/1765* (2013.01); *G01N 2021/755* (2013.01)

(56) References Cited

U.S. PATENT DOCUMENTS

| | | | | |
|---|---|---|---|---|
| 2003/0219891 | A1 | 11/2003 | Yazawa et al. | |
| 2010/0045993 | A1* | 2/2010 | Martini .............. | A61B 5/14532 356/436 |
| 2010/0045994 | A1* | 2/2010 | Ogawa ................. | G01N 21/253 356/436 |
| 2012/0140230 | A1 | 6/2012 | Miller | |
| 2018/0136040 | A1* | 5/2018 | Sodeoka ............... | G01J 3/0221 |

FOREIGN PATENT DOCUMENTS

| | | | | |
|---|---|---|---|---|
| JP | 200065744 | A | 3/2000 | |
| JP | 2003329681 | A | 11/2003 | |
| JP | 2007322246 | A | 12/2007 | |
| JP | 2012255727 | A | 12/2012 | |
| JP | 2014145774 | A | 8/2014 | |
| JP | 2016161301 | A | 9/2016 | |
| WO | WO2018134723 | A1 * | 7/2018 | ................ G01J 3/42 |

OTHER PUBLICATIONS

Written Opinion mailed Jan. 28, 2020 in International Application No. PCT/JP2019/042733.

* cited by examiner

ANALYZER AND ANALYSIS METHOD

TECHNICAL FIELD

The present disclosure relates to an analyzer that analyzes a specimen and an analysis method for analyzing a specimen.

BACKGROUND ART

Typically, in clinical examinations for analyzing protein, sugar, lipid, enzyme, hormone, inorganic ion, disease marker, or the like contained in a biological specimen such as blood or urine, a sample and a reagent are dispensed into a reaction vessel, and analysis for an examination item is made based on a change in optical characteristics such as absorbed light, fluorescent light, emitted light, or scattered light. For example, in an automatic blood analyzer, blood and a reaction reagent are dispensed into a reaction vessel and thoroughly mixed, and measurement of a concentration of an examination item that is a predetermined biological substance such as glucose or cholesterol is performed by measuring absorbance of the solution.

In recent years, as the number of measurement items in clinical examinations has increased, analysis of a small amount of biological specimen with high sensitivity has been required. This is because it is necessary to measure as many analysis items as possible from a limited amount of sample, or analysis items have changed due to the accumulation of knowledge and technological progress, which makes measurement of a trace amount of substance necessary. In response to the need for small-amount and high-sensitive analysis, an amount of a reaction solution to be dispensed into the reaction vessel used in the analyzer is getting smaller.

Typically, an autoanalyzer used in clinical examinations dispenses, while transferring a plurality of reaction vessels one after another, a biological specimen into each reaction vessel, dispenses a reagent, performs stirring on the reaction vessel, performs photometry on the reaction vessel, and then cleans the reaction vessel with a cleaning solution for reuse. After initiating the reaction between the biological specimen and the reagent at a predetermined timing, photometry data such as absorbance is acquired by causing a light source to emit light to and through the reaction vessel, each time the reaction vessel into which the biological specimen and the reagent have been dispensed passes through a photometer until a predetermined timing before cleaning.

Quartz glass or resin, which has low photometry value noise and high optical transparency, is widely used as the material of such reaction vessels. For reaction vessels designed to be repeatedly used, a scratch or foreign matter such as dirt on each reaction vessel is often detected as noise during photometry. To cope with such a situation, typically, a photometry value of an empty reaction vessel or a reaction vessel containing purified water is measured as a baseline, the purified water is removed from the reaction vessel if the purified water exists, a biological specimen and a reagent are dispensed into the same reaction vessel, and then photometry is performed on the reaction vessel.

For example, PTL 1 discloses an autoanalyzer that measures the intensity of light transmitted through a vessel containing purified water and uses the value thus measured as base absorbance (baseline value) for each vessel.

Proposed in PTL 2 is a method for correcting a value that results from measuring, by a photometry sensor, luminous flux transmitted through a reaction vessel containing a liquid in an autoanalyzer capable of measuring optical characteristics of a liquid specimen with high reliability even when a light source that has large output fluctuations is used.

Further, PTL 3 discloses, as a technique for increasing reliability of a measured value through data correction, a method for measuring absorbance A of a reaction liquid based on input light intensity Io measured using a predetermined solution that does not absorb light and transmitted light intensity I measured using a reaction liquid that is kept for a reaction time T after mixing a specimen and a reagent, in which the input light intensity is corrected by $Io'=Io*(Ib/Ibo)$ where Ibo represents light intensity at a portion constant in transmittance that is measured immediately before the Io measurement, and Ib represents light intensity at the portion constant in transmittance that is measured immediately before the I measurement, and the absorbance A of the reaction solution is obtained by $A=\log(Io'/I)$.

CITATION LIST

Patent Literature

PTL 1: JP 2000-65744 A
PTL 2: JP 2007-322246 A
PTL 3: JP 2012-255727 A

SUMMARY OF INVENTION

Technical Problem

However, in the optical analysis of a trace amount of reaction solution, when purified water is put into the reaction vessel for measuring the photometry baseline value as in the example in the related art, the purified water cannot be completely removed because the reaction vessel is small in size and thus water remains.

In the method disclosed in PTL 1, when a light source that tends to fluctuate in output for each measurement is used, the base absorbance varies for each vessel, so that it is conceivable that the reliability of the photometry value decreases. Further, in the analyzers disclosed in PTL 2 and 3, there is a possibility that variations in light intensity of the light source increase due to the time difference from the baseline measurement, and the analysis accuracy deteriorates accordingly.

Further, in analysis using a reaction vessel having a small volume of 50 microliters or less, the water residue or photometry time difference as described above has a great impact on analysis accuracy as compared with scratches or molding differences.

The present disclosure therefore provides an analyzer that analyzes a specimen with high accuracy and an analysis method for analyzing a specimen with high accuracy.

Solution to Problem

The analyzer according to the present disclosure include a first reaction vessel which contains a reagent, a second reaction vessel which contains a specimen and the reagent, a detector which detects optical characteristics of the first reaction vessel and optical characteristics of the second reaction vessel, and a controller which analyzes components of the specimen in the second reaction vessel using the optical characteristics of the first reaction vessel as a baseline.

The other features related to the present disclosure will be apparent from the description herein and the accompanying drawings. Further, aspects of the present disclosure are achieved and practiced by the elements, combinations of various elements, and the following detailed description and appended claims.

It should be understood that the description herein is given by way of typical example only and is not intended to limit the scope of claims set forth in the present application or applications in any sense.

Advantageous Effects of Invention

As described above, the structure according to the present disclosure allows the specimen to be analyzed with high accuracy.

Problems, configurations, and effects other than those described above will be apparent from the description of the embodiments given below.

DESCRIPTION OF EMBODIMENTS

Figure 1:
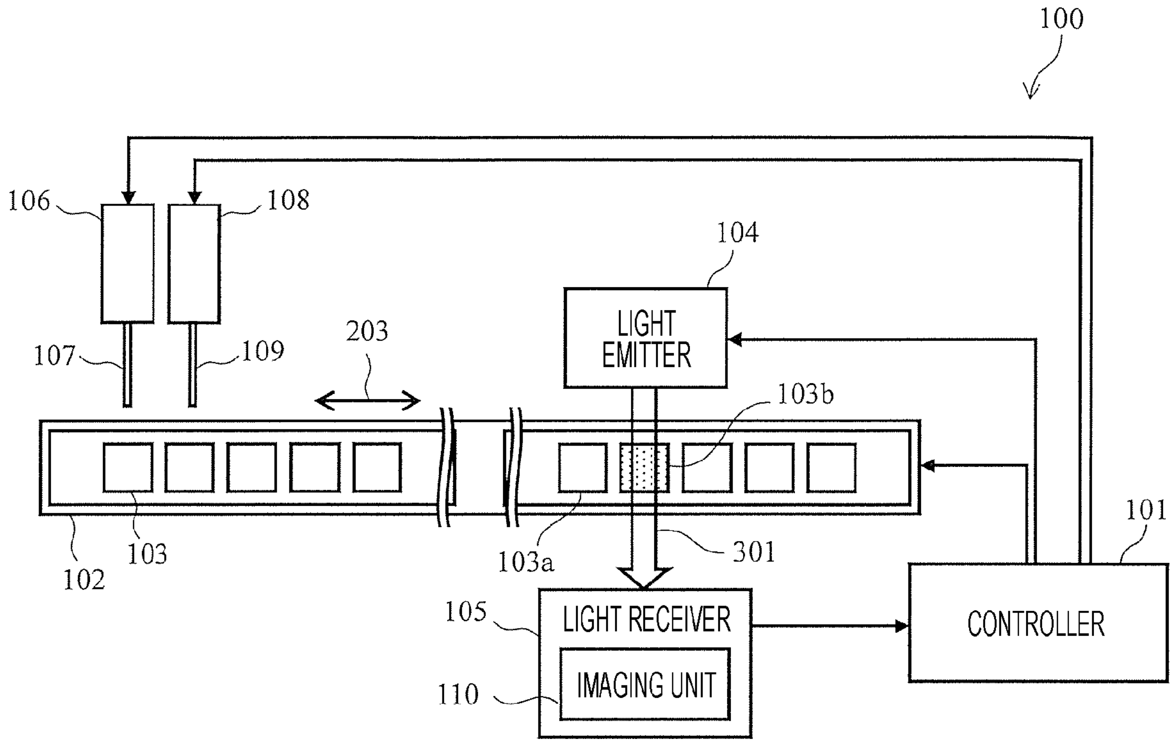
FIG. 1 is a diagram schematically showing a structure of an analyzer according to a first embodiment.

FIG. 1 is a diagram schematically showing a structure of an analyzer 100 according to the first embodiment. As shown in FIG. 1, the analyzer 100 includes a controller 101, a reaction vessel holder 102, a light emitter 104 and a light receiver 105 (measurement unit), a sample dispenser 106, and a reagent dispenser 108.

The reaction vessel holder 102 holds a plurality of reaction vessels 103 and is movable in a scanning direction 203 along a plane, for example, with the help of an actuator or the like (not shown). The reaction vessel holder 102 may have a disk shape rotatable about its center axis, which allows the plurality of reaction vessels 103 to be arranged in a circumferential direction of the reaction vessel holder 102, for example.

As a material of the reaction vessels 103, an optically transparent material may be used in a manner that depends on a detection light. Specifically, the material of the reaction vessels 103 is, for example, quartz glass, resin, or the like. When each reaction vessel 103 is made of resin, the plurality of reaction vessels 103 can be integrally molded, which has an advantage in that a molding error among the plurality of reaction vessels 103 is small. Examples of the resin used as the material of the reaction vessels 103 include polystyrene and polymethylmethacrylate.

The sample dispenser 106 includes a sample dispensing nozzle 107, and dispenses a sample (specimen) into the reaction vessels 103. Examples of the sample include a biological specimen such as blood or urine and a solution obtained by subjecting such a biological specimen to a predetermined pretreatment. The reagent dispenser 108 includes a reagent dispensing nozzle 109, and dispenses a reagent into the reaction vessels 103.

The light emitter 104 includes a light source that emits light in a photometry direction 301, that is, toward a side surface of each reaction vessel 103. The light receiver 105 includes a photosensor (not shown) such as a photomultiplier tube or a photodiode, and detects optical characteristics such as light transmitted through, light absorbed by, fluorescent light from, light emitted from, light scattered by each reaction vessel 103 to measure a photometry value. The light receiver 105 outputs the photometry value to the controller 101.

The light emission and light detection are made by the light emitter 104 and the light receiver 105 at a predetermined timing and for a predetermined period of time. For example, a configuration may be employed where the light emitter 104 continuously emits light, and the reaction vessel holder 102 is continuously actuated to cause the light receiver 105 to detect a change in intensity of light between the light emitter 104 and the light receiver 105. This allows photometry to be continuously performed on the reaction vessels 103 passing between the light emitter 104 and the light receiver 105. A configuration may be employed where the reaction vessel holder 102 is stopped after each reaction vessel 103 on which photometry is to be performed is moved to a position between the light emitter 104 and the light receiver 105, and photometry is performed on the reaction vessel 103.

The controller 101 is a computer that performs centralized control of the analyzer 100 to control actuation of the reaction vessel holder 102, the light emitter 104, the light receiver 105, the sample dispenser 106, the reagent dispenser 108, and an imaging unit 110. Further, the controller 101 performs, upon receipt of the photometry value from the light receiver 105, various data manipulations to analyze a concentration, characteristics, or the like of a specific component in the sample.

The light receiver 105 may include the imaging unit 110 capable of capturing an image of the plurality of reaction vessels 103. The light receiver 105 may detect light such as light transmitted through, light absorbed by, fluorescent light from, light emitted from, light scattered by each reaction vessel 103 based on image data captured by the imaging unit 110 to measure the photometry value. Further, the imaging unit 110 may output the image data thus captured to the controller 101 to cause the controller 101 to determine the concentration of the specific component from a color tone of each reaction vessel 103 based on the image data. FIG. 1 shows, as an example, a structure where the imaging unit 110 is mounted on the light receiver 105. However, the imaging unit 110 may be disposed at any position as long as the imaging unit 110 can capture the images of the plurality of reaction vessels 103 and, thus, the position of the imaging unit 110 may be changed as needed.

For example, a color tone part where a color tone serving as a reference for the optical characteristics of each reaction vessel 103 is shown may be provided at a position, such as in a gap between the plurality of reaction vessels 103 or on the reaction vessel holder 102, where the imaging unit 110 can capture an image of the color tone part, so that the imaging unit 110 captures images of the color tone part together with the plurality of reaction vessels 103. This allows the controller 101 to analyze the specific component by comparing the color tone on the color tone part with the color tone of each reaction vessel 103 in the captured image data.

Figure 2A:
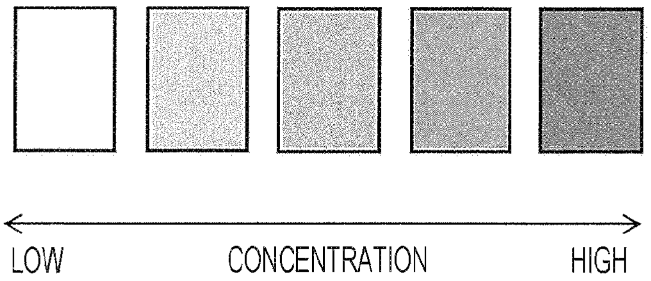
FIGS. 2A and 2B are diagrams schematically showing an example of a color tone part.
Figure 2B:
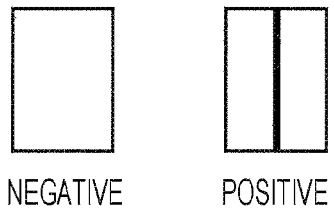

FIGS. 2A and 2B diagrams schematically showing an example of the color tone part. As the color tone part, for example, in a case where a reaction solution changes its color in a manner that depends on a concentration of a substance to be detected, a color scale representing a color tone of the reaction solution at a known concentration as shown in FIG. 2A may be used. Further, as shown in FIG. 2B, when a determination is made as to whether the substance to be detected is contained in the sample, that is, whether a detection item is positive or negative, a line indicating the color tone representing whether the detection item is positive or negative may be used as the color tone part. Further, although not shown, a reaction vessel 103 into which the reagent and the sample having a known concentration are dispensed may be provided and used as the color tone part.

The analyzer 100 may include a thermoregulation mechanism (not shown) that regulates the temperature of the reaction vessel 103. With thermoregulation mechanism, it is possible to maintain a temperature optimum for the sample that is a biological specimen and, thereby, to increase measurement accuracy.

The analyzer 100 may include a stirring mechanism (not shown) that stirs the solution dispensed into the reaction vessel 103. Note that the solution may be stirred with the sample dispensing nozzle 107 or the reagent dispensing nozzle 109 without providing such a stirring mechanism.

A description will be given below of an example of operation of the controller 101. First, a user causes the reaction vessel holder 102 to hold the reaction vessels 103 before analysis made by the analyzer 100. The controller 101 may actuate a three-axis robot or the like (not shown) capable of moving the reaction vessels 103 to install the reaction vessels 103 into the reaction vessel holder 102.

The controller 101 moves the reaction vessel holder 102 to a predetermined position such that a predetermined reaction vessel 103*a* (first reaction vessel) is located at a position where the reagent can be dispensed by the reagent dispenser 108 (in a range where the reagent dispenser 108 is movable). The controller 101 actuates the reagent dispenser 108 to dispense a predetermined amount of reagent into the reaction vessel 103*a* through the reagent dispensing nozzle 109. Note that, when the reagent does not change over time, the reagent may be introduced into the reaction vessel 103 before the reaction vessel 103 is held in the reaction vessel holder 102.

Next, the controller 101 actuates the reaction vessel holder 102 to move the reaction vessel 103*a* to a position on a line connecting the light emitter 104 and the light receiver 105. Subsequently, the controller 101 actuates the light emitter 104 to emit light to a side surface of the reaction vessel 103*a*. The light receiver 105 detects light transmitted through or light scattered by the reaction vessel 103*a* and outputs the result to the controller 101. As will be described later, the photometry value of the reaction vessel 103*a* into which only the reagent has been dispensed is used as a baseline of the optical characteristics of the specimen.

Next, the controller 101 moves the reaction vessel holder 102 to a predetermined position such that a predetermined reaction vessel 103*b* (second reaction vessel) is located at a position where the sample can be dispensed by the sample dispenser 106 (in a range where the sample dispensing nozzle 107 is movable). The controller 101 actuates the sample dispenser 106 to dispense a predetermined amount of sample into the reaction vessel 103*b* through the sample dispensing nozzle 107.

Next, the controller 101 actuates the reagent dispenser 108 to dispense the reagent into the reaction vessel 103*b* into which the sample has been dispensed to create a reaction solution. The controller 101 stirs the reaction solution in the reaction vessel 103*b* by, for example, rotating the reagent dispensing nozzle 109 of the reagent dispenser 108 in the reaction vessel 103*b*. Subsequently, the controller 101 actuates the reaction vessel holder 102 to move the reaction vessel 103*b* to the position on the line connecting the light emitter 104 and the light receiver 105, and actuates the light emitter 104 to emit light to a side surface of the reaction vessel 103*b*. The light receiver 105 detects optical characteristics such as absorbance or emission intensity of the reaction vessel 103*b* and outputs the optical characteristics to the controller 101.

The controller 101 computes a photometry value of the reaction vessel 103*b* including the sample using the photometry value (reagent blank) of the reaction vessel 103*a* as the baseline and analyzes a concentration of a specific component in the sample. The controller 101 may display the analysis result on a display (not shown) or store the analysis result in a storage.

Here, the reaction vessel 103*b* into which the sample is dispensed may be positioned in close proximity to the reaction vessel 103*a* into which only the reagent is dispensed. The reaction vessels 103*a* and 103*b* may be arranged adjacent to each other. For example, in a case where the plurality of reaction vessels 103 are made of resin and integrally molded, if each of the reaction vessels 103 has a small volume, reaction vessels 103 adjacent to each other have almost the same surface scratch or molding difference, so that their respective baseline values of the photometry value are extremely approximate to each other. This allows an increase in analysis accuracy. Note that the small volume corresponds to a solution amount of 50 microliters or less, and more preferably 20 microliters or less.

When the size of the reaction vessel 103 is small, the usage of the reagent becomes the same as or smaller than the usage in the related art, which is economical. When the reaction vessel 103 is disposable, it is conceivable that the number of reaction vessels 103 used in the analyzer 100 according to the present embodiment will increase, but since each of the reaction vessels 103 is small in size, a material cost of the reaction vessels 103 is estimated to be almost the same as the material cost in the related art.

Further, the reaction vessel 103*a* into which only the reagent is dispensed and the reaction vessel 103*b* into which the reagent and the specimen are dispensed may be arranged in a range where the imaging unit 110 can capture images of both the reaction vessel 103*a* and the reaction vessel 103*b* at the same time. This eliminates a difference in photometry time between the reaction vessels 103*a* and 103*b* and, in turn, prevents variations in intensity of light emitted from the light emitter 104, which allows an increase in analysis accuracy.

Figure 3A:
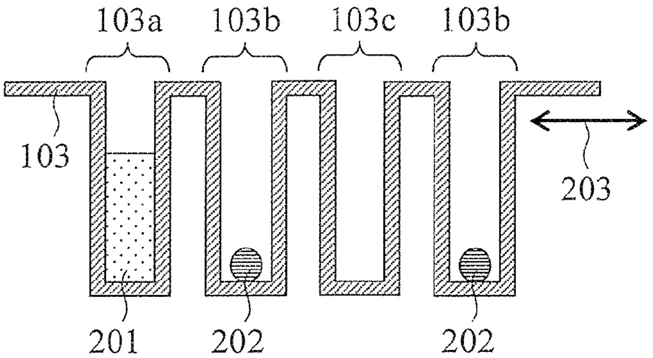
FIGS. 3A and 3B are diagrams schematically showing a state where a sample and a reagent are dispensed into a plurality of reaction vessels.
Figure 3B:
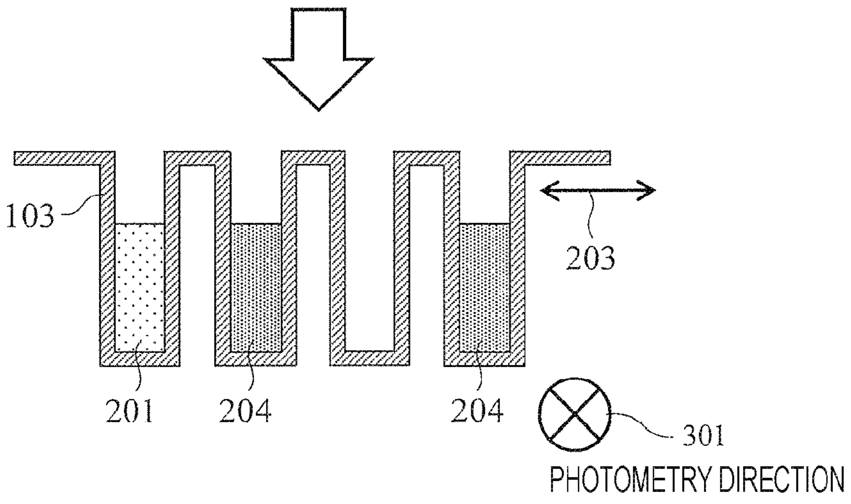

FIGS. 3A and 3B are diagrams schematically showing a state where the sample and the reagent are dispensed into the plurality of reaction vessels 103. As shown in FIG. 3A, the controller 101 actuates the reagent dispenser 108 to dispense a reagent 201 into the reaction vessel 103*a*, and actuates the sample dispenser 106 to dispense a biological specimen 202 into the reaction vessel 103*b* adjacent to the reaction vessel 103*a*. Further, a reaction vessel 103*c* that is empty may be disposed adjacent to the reaction vessel 103*b*. Subsequently, as shown in FIG. 3B, the controller 101 actuates the reagent dispenser 108 to dispense the reagent 201 into the reaction vessel 103*b* into which the biological specimen 202 has been dispensed to create a reaction solution 204. This allows the controller 101 to compute the photometry value of the reaction solution 204 using the photometry value of the reaction vessel 103*a* (reagent blank) as the baseline. Note that the photometry value of the empty reaction vessel 103*c* may be additionally measured for correcting the photometry value of the reaction solution 204 or the baseline.

Figure 4A:
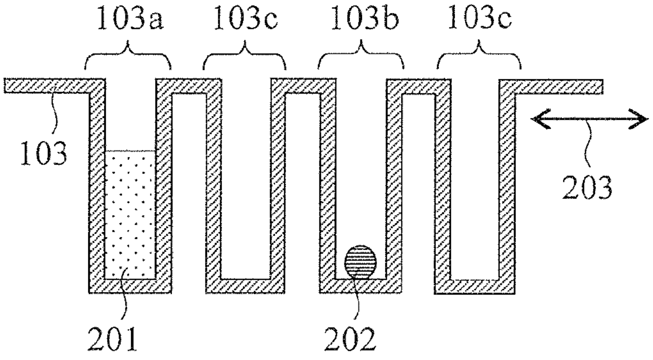
FIGS. 4A and 4B are diagrams schematically showing a state where the sample and the reagent are dispensed into the plurality of reaction vessels.
Figure 4B:
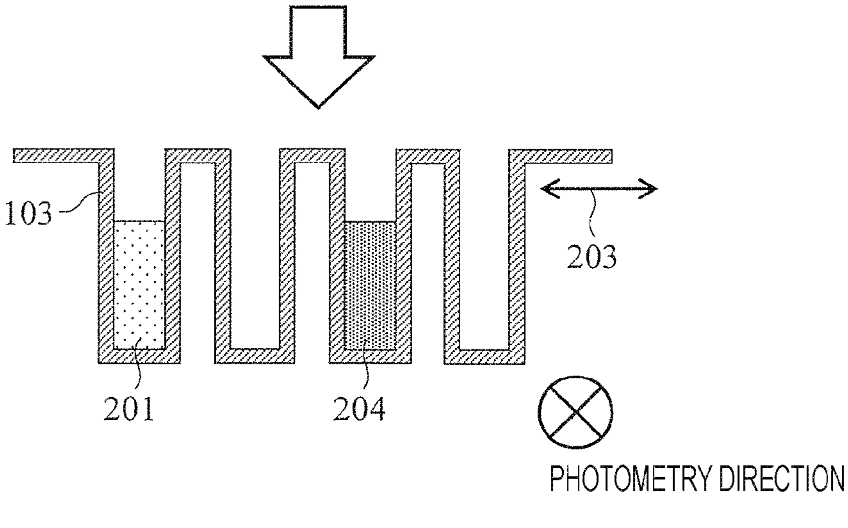

FIGS. 4A and 4B are diagrams schematically showing another example of a state where the sample and the reagent are dispensed into the plurality of reaction vessels 103. In the example shown in FIGS. 4A and 4B, the reaction vessels 103*a* and 103*b* are not adjacent to each other but are arranged such that the empty reaction vessel 103*c* is interposed between the reaction vessels 103*a* and 103*b*. The other points are the same as in FIGS. 3A and 3B, and therefore no description will be given of the other points. Further, although not shown, the reagent and the biological specimen may be dispensed with the reaction vessels 103*a* and 103*b* alternately arranged without the empty reaction vessel 103*c*.

Figure 5A:
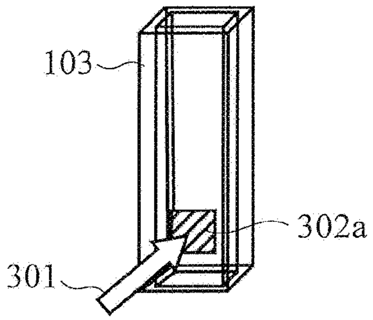
FIGS. 5A and 5B are diagrams schematically showing how emitted light having a different photometry area impinges on a single or a plurality of reaction vessels.
Figure 5B:
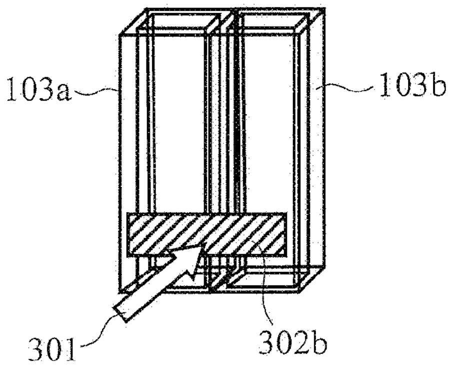

FIGS. 5A and 5B diagrams schematically showing how light is emitted by the light emitter 104. FIG. 5A shows an example of emitting light to a single reaction vessel 103. As shown in FIG. 5A, the light emitter 104 emits light to a photometry area 302*a* on the side surface of the reaction vessel 103 in the photometry direction 301 orthogonal to the photometry area 302*a*. Note that the photometry direction 301 need not be orthogonal to the side surface of the reaction vessel 103.

Each time the light emitter 104 emits light, the controller 101 may stop the actuation of the reaction vessel holder 102, or alternatively the controller 101 may cause the light emitter 104 to emit light while actuating the reaction vessel holder 102.

FIG. 5B shows an example of emitting light to the plurality of reaction vessels 103 at the same time. In FIG. 5B, the light emitter 104 emits light to a photometry area 302*b* extending over the two reaction vessels 103*a* and 103*b* in the photometry direction 301 orthogonal to the photometry area 302*b*. At this time, the light receiver 105 detects, at the same time, the optical characteristics of the reaction vessels 103*a* and 103*b* to which light has been emitted.

Such an arrangement of the reaction vessel 103*a* into which only the reagent is dispensed and the reaction vessel 103*b* into which the specimen and the reagent are dispensed in the photometry area 302*b* allows photometry to be performed on the reaction vessels 103*a* and 103*b* at the same time. This eliminates a time difference in photometry timing between the reaction vessel 103*a* serving as the baseline and the reaction vessel 103*b* containing the specimen, which allows a reduction in influence of fluctuations and variations in output of the light source as well as an increase in analysis accuracy.

Note that the number of the reaction vessels 103 located in the photometry area 302*b* where the light emitter 104 can emit light is not limited to two and may be any number. Further, a set of the light emitter 104 and the light receiver 105 may be provided for each reaction vessel 103, and as many sets of the light emitters 104 and the light receivers 105 as the number of the reaction vessels 103 on which measurement is performed at the same time may be provided.

When light is emitted to the plurality of reaction vessels 103 at the same time for photometry as in the example shown in FIG. 5B, the controller 101 may compare a plurality of photometry values detected at the same time to detect whether each of the reaction vessel 103 has an abnormality. At this time, for example, among the photometry values of the plurality of reaction vessels 103, a photometry value that falls outside a normal value range is determined to be abnormal.

Figure 6:
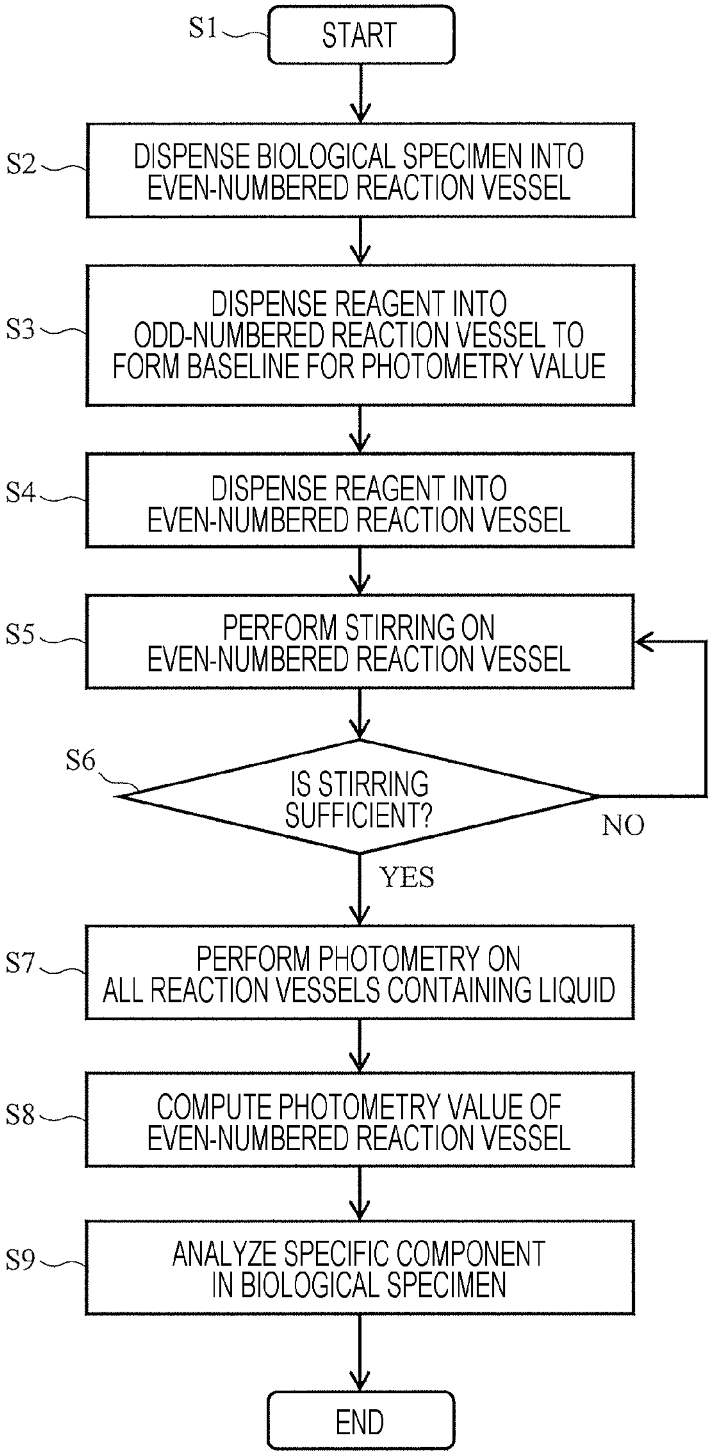
FIG. 6 is a flowchart showing an example of an analysis method according to the first embodiment.

FIG. 6 is a flowchart showing an example of an analysis method executed by the analyzer 100 according to the present embodiment. A description will be given below of a case where the reaction vessel holder 102 is structured to have the plurality of reaction vessels 103 arranged in a row, the reaction vessels 103 are numbered in the order of arrangement, only the reagent is introduced into odd-numbered reaction vessels 103*a*, and the reagent and the specimen are introduced into even-numbered reaction vessels 103*b*.

First, the user causes the reaction vessel holder 102 to hold the reaction vessels 103 before analysis made by the analyzer 100 and causes a power source or the like (not shown) to bring the analyzer 100 into operation.

In step S1, the controller 101 verifies that the reaction vessels 103 are installed in the reaction vessel holder 102 and then starts the operation. At this time, the controller 101 stores the number and position of each of the reaction vessels 103 into the storage. Note that the number and position of each of the reaction vessels 103 may be stored in advance.

In step S2, the controller 101 actuates the reaction vessel holder 102 to position an even-numbered reaction vessel 103*b* in the range where the sample dispenser 106 is movable and then actuates the sample dispenser 106 to dispense a predetermined amount of biological specimen into the even-numbered reaction vessel 103*b*.

In step S3, the controller 101 actuates the reaction vessel holder 102 to position an odd-numbered reaction vessel 103*a* in the range where the reagent dispenser 108 is movable and then actuates the reagent dispenser 108 to dispense a predetermined amount of reagent into the odd-numbered reaction vessel 103*a*.

In step S4, the controller 101 actuates the reaction vessel holder 102 to position the even-numbered reaction vessel 103*b* in the range where the reagent dispenser 108 is movable and then actuates the reagent dispenser 108 to dispense the predetermined amount of reagent into the even-numbered reaction vessel 103*b*.

In step S5, the controller 101 actuates the reagent dispenser 108 to perform stirring on the even-numbered reaction vessel 103*b* to cause the biological specimen and the reagent to react with each other. In this step, the reaction solution may be stirred by being drawn in and out of the reagent dispensing nozzle 109. The reaction solution may be stirred by rotation of the reagent dispensing nozzle 109 in the reaction vessel 103*b*. Further, a stirring means rather than the reagent dispensing nozzle 109 may be actuated to stir the reaction solution.

In step S6, the controller 101 determines whether stirring on the reaction vessel 103*b* is sufficient. In this step, the controller 101 may actuate the light emitter 104 and the light receiver 105 to perform photometry on the reaction vessel 103*b* and determine whether stirring is sufficient based on the photometry value. Further, the controller 101 may actuate the imaging unit 110 to capture the image of the reaction vessel 103*b*, receive the image data, and determine whether stirring is sufficient based on the color tone of the image data.

When stirring is not sufficient (No), the process returns to step S5, and the controller 101 actuates the reagent dispenser 108 to perform stirring on the reaction vessel 103*b* again.

When stirring is sufficient (Yes), the process proceeds to step S7, and the controller 101 actuates the light emitter 104 and the light receiver 105. The light emitter 104 emits light to the odd-numbered reaction vessel 103*a* and the even-numbered reaction vessel 103*b* at the same time, and the light receiver 105 detects the optical characteristics of these reaction vessels 103*a* and 103*b*. The light receiver 105 outputs the detection result to the controller 101.

In step S8, the controller 101 computes, upon receipt of the detection result from the light receiver 105, the photometry value of the even-numbered reaction vessel 103*b* using the odd-numbered reaction vessel 103*a* as the baseline.

In step S8, the controller 101 analyzes the concentration of the specific component in the biological specimen based on the photometry value of the even-numbered reaction vessel 103*b* and brings the operation to an end. At this time, the analysis result may be output to the display (not shown).

In the example described above, the reaction vessel 103*a* into which only the reagent is dispensed is assigned an odd number, the reaction vessel 103*b* into which the reagent and the biological specimen are dispensed is assigned an even number, and the reaction vessel 103*a* and the reaction vessel 103*b* are arranged adjacent to each other. However, the arrangement of the reaction vessel 103*a* and the reaction vessel 103*b* is not limited to the example. For example, the empty reaction vessel 104*c* may be provided every third reaction vessels.

As described above, in the analyzer and analysis method according to the present embodiment, the first reaction vessel containing only the reagent and the second reaction vessel containing the reagent and the specimen are held in close proximity to each other, the photometry value of the second reaction vessel is obtained using the first reaction vessel as the baseline value, and the components in the biological specimen are analyzed. Such a configuration can almost completely eliminates a time difference in photometry timing between the baseline and the specimen, as compared with a method in the related art in which the baseline is measured with a liquid such as purified water, the liquid is removed, the specimen is dispensed, and then photometry is performed; therefore, the configuration allows a reduction in influence of fluctuations and variations in output of the light source and allows the component concentration in the specimen to be computed with high accuracy.

Further, according to the present embodiment, unlike the method in the related art, neither the specimen nor the reagent is diluted with a residue of the liquid used for the baseline, which makes it possible to suppress variations in the analysis value.

A description will be given below of a comparative example and example according to the present embodiment.

Comparative Example 1

First, 18 reaction vessels 103 were made of resin optically transparent in a visible light wavelength range and were integrally molded to be arranged in a row. The amount of solution to be contained in each reaction vessel 103 was 30 μL, and an optical path length of each reaction vessel 103 was designed to be 2 mm. The reaction vessels 103 are numbered 1 through 18 in the order of arrangement.

In the comparative example 1, in order to measure the baseline value, an orange G aqueous solution obtained by adding a dye (orange G) to purified water was dispensed into each reaction vessel 103, and photometry was performed using the light emitter 104 and the light receiver 105. Then, the orange G aqueous solution was removed from each reaction vessel 103, an absorption solution (sample) to be measured was dispensed, and photometry was performed using the light emitter 104 and the light receiver 105. The photometry was performed by emitting, to each reaction vessel 103, light having a wavelength of 470 nm and light having a wavelength of 600 nm. The controller 101 computed absorbance of the absorption solution for each of the wavelengths of 470 nm and 600 nm of the emitted light using the baseline value based on the orange G aqueous solution and computed a difference in absorbance between the above-described two wavelengths.

Figure 7A:
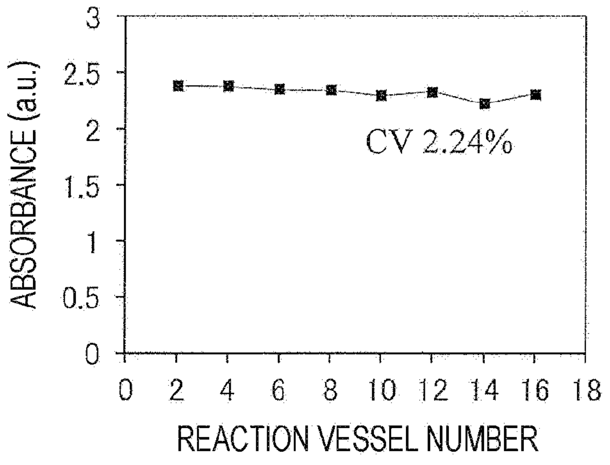
FIGS. 7A and 7B are diagrams showing results of measuring absorbance according to a comparative example 1 and an example 1.

FIG. 7A is a graph showing the result of measuring the absorbance according to the comparative example 1. In FIG. 7A, differences in absorbance between the above-described two wavelengths in the reaction vessels 103 numbered 2 through 16 are plotted. A photometry variation (coefficient of variation) computed among the plots was 2.24%.

Example 1

In the example 1, reaction vessels 103 numbered 1 through 18 were prepared in the same manner as in the comparative example 1, and a liquid (purified water) used to resemble the reagent was dispensed into odd-numbered reaction vessels 103, and the absorption solution was dispensed into even-numbered reaction vessels 103. The reaction vessel holder 102 was actuated to pass between the light emitter 104 and the light receiver 105 in the order of the reaction vessels 103 numbered 1 through 18, and photometry was continuously performed.

The absorbance of each of the even-numbered reaction vessels 103 was computed using the photometry value of the immediately preceding odd-numbered reaction vessel 103 as the baseline. The above-described photometry was performed for each of the wavelengths of 470 nm and 600 nm of the emitted light to compute a difference in absorbance between the above-described two wavelengths.

Figure 7B:
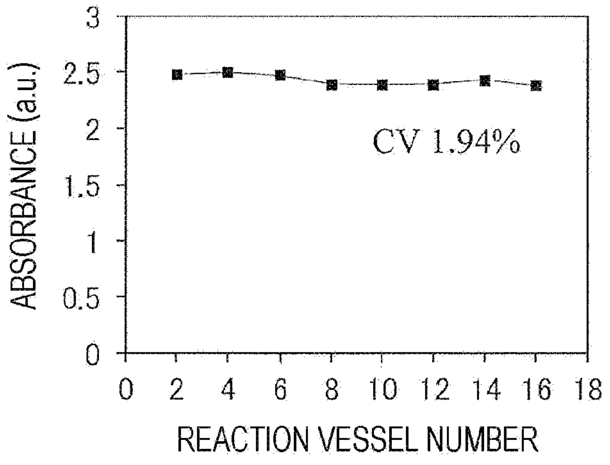

FIG. 7B is a graph showing the result of measuring the absorbance according to the example 1. In FIG. 7B, differences in absorbance between the above-described two wavelengths in the reaction vessels 103 numbered 2 through are plotted. A photometry variation (coefficient of variation) computed among the plots was 1.94%.

As described above, it was found that performing photometry using the photometry value of the adjacent reaction vessel 103 as the baseline reduces the photometry variation as compared with the comparative example 1, and the absorption solution can be analyzed with high accuracy.

[Modification]

The present disclosure is not limited to the above-described embodiments, and various modifications fall within the scope of the present disclosure. For example, the above-described embodiments have been described in detail to facilitate the understanding of the present disclosure, and the present disclosure is not necessarily limited to an embodiment having all the components described above. Further, some components of one embodiment may be replaced with components of another embodiment. Further, the components of one embodiment may additionally include components of another embodiment. Further, it is possible to add, to some components of each embodiment, some components of another embodiment, delete some components of each embodiment, or replace some components of each embodiment with some components of another embodiment.

REFERENCE SIGNS LIST

100 analyzer
101 controller
102 reaction vessel holder
103 reaction vessel
104 light emitter
105 light receiver
106 sample dispenser
107 sample dispensing nozzle
108 reagent dispenser
109 reagent dispensing nozzle
110 imaging unit
201 reagent
202 biological specimen
203 scanning direction of reaction vessel holder
204 reaction solution
301 photometry direction
302*a*, 302*b* photometry area

The invention claimed is:

1. An analyzer, comprising:

a first reaction vessel having a volume capacity of less than 50 μL which contains a reagent;

a second reaction vessel integrally molded together with the first reaction vessel and also having a volume capacity of less than 50 μL which contains a specimen and the reagent;

a detector which detects optical characteristics of the first reaction vessel and optical characteristics of the second reaction vessel;

a controller which analyzes components of the specimen in the second reaction vessel using the optical characteristics of the first reaction vessel as a baseline; and a light emitter arranged at a position to irradiate a photometry area extending over surfaces of the first reaction vessel and the integrally molded second reaction vessel at the same time with light along a photometry direction orthogonal to the photometry area.

2. The analyzer according to claim 1, wherein the detector simultaneously detects the optical characteristics of the first reaction vessel and the optical characteristics of the second reaction vessel.

3. The analyzer according to claim 1, wherein the second reaction vessel is disposed in close proximity to the first reaction vessel.

4. The analyzer according to claim 1, wherein the second reaction vessel is disposed adjacent to the first reaction vessel.

5. The analyzer according to claim 1, further comprising an imaging unit which captures an image of the first reaction vessel and the second reaction vessel.

6. The analyzer according to claim 5, wherein the first reaction vessel and the second reaction vessel are arranged within an image-capture range of the imaging unit.

7. The analyzer according to claim 5, wherein the detector detects the optical characteristics of the first reaction vessel and the optical characteristics of the second reaction vessel based on a color tone of the image captured by the imaging unit.

8. The analyzer according to claim 5, wherein the imaging unit captures an image of a color tone part, which serves as a reference for the optical characteristics, together with the first reaction vessel and the second reaction vessel, and the controller analyzes the components of the specimen in the second reaction vessel by comparing optical characteristics of the color tone part with the optical characteristics of the second reaction vessel.

9. The analyzer according to claim 1, wherein the controller further detects an abnormality in the first reaction vessel and the second reaction vessel based on a result of detection made by the detector.

10. The analyzer according to claim 1, wherein the first reaction vessel and the second reaction vessel are made of resin.

11. An analysis method, comprising:

preparing an analyzer including a first reaction vessel which contains a reagent, a second reaction vessel which contains a specimen and the reagent, a detector which detects optical characteristics of the first reaction vessel and optical characteristics of the second reaction vessel, and a controller which analyzes components of the specimen in the second reaction vessel based on a result of detection made by the detector;

irradiating, by a light emitter, a photometry area extending over surfaces of the first reaction vessel and the second reaction vessel at the same time with light along a photometry direction orthogonal to the photometry area;

detecting, by the detector, the optical characteristics of the first reaction vessel and the optical characteristics of the second reaction vessel; and analyzing, by the controller, the components of the specimen in the second reaction vessel using the optical characteristics of the first reaction vessel as a baseline, wherein the irradiating and detecting steps are performed on the first reaction vessel and the second reaction vessel that each have a volume capacity of more than 0 μL and less than 50 μL, and wherein the first reaction vessel and the second reaction vessel are integrally molded together.

12. The analysis method according to claim 11, wherein, in the preparing the analyzer, the first reaction vessel containing the reagent is installed in the analyzer, and the reagent and the sample are dispensed into the second reaction vessel.

13. The analysis method according to claim 11, wherein, in the preparing the analyzer, the first reaction vessel and the second reaction vessel are installed in the analyzer, the specimen is dispensed into the second reaction vessel, and then the reagent is dispensed into the first reaction vessel and the second reaction vessel.

* * * * *